United States Patent [19]

Diedrich et al.

[11] 4,311,752

[45] Jan. 19, 1982

[54] ETHYLENE COPOLYMERS AND THEIR USE FOR THE MANUFACTURE OF FILMS

[75] Inventors: Bernd Diedrich, Eschborn; Ludwig Böhm, Mainz; Olaf Heine, Königstein/, all of Fed. Rep. of Germany

[73] Assignee: Hoechst Aktiengesellschaft, Frankfurt am Main, Fed. Rep. of Germany

[21] Appl. No.: 93,884

[22] Filed: Nov. 13, 1979

Related U.S. Application Data

[63] Continuation of Ser. No. 2,867, Jan. 11, 1979, abandoned.

[30] Foreign Application Priority Data

Jan. 14, 1978 [DE]  Fed. Rep. of Germany ....... 2801541

[51] Int. Cl.³ .............................................. C08F 10/02
[52] U.S. Cl. .................................. 428/220; 526/124; 526/159; 526/348; 526/348.1; 526/348.2; 526/348.4; 526/348.5; 526/348.6; 526/905
[58] Field of Search ............... 428/339, 220; 526/159, 526/348, 348.1, 348.2, 348.4, 348.6, 905, 348.5

[56] References Cited

U.S. PATENT DOCUMENTS

| | | | |
|---|---|---|---|
| 3,392,213 | 7/1968 | Berger | 260/878 B |
| 3,513,143 | 5/1970 | Diedrich et al. | 526/348.6 |
| 3,592,880 | 7/1971 | Diedrich et al. | 526/348.6 |
| 3,981,849 | 9/1976 | Frese et al. | 526/348.6 |
| 4,133,944 | 1/1979 | Cooper et al. | 526/348.6 |

FOREIGN PATENT DOCUMENTS

| | | | |
|---|---|---|---|
| 833673 | 2/1970 | Canada | 526/905 |
| 1233599 | 5/1971 | United Kingdom | 526/905 |
| 1355245 | 6/1974 | United Kingdom | . |

OTHER PUBLICATIONS

Raff et al., Crystalline Olefin Polymers, vol. XX, Part II, Interscience Publ., N.Y., (1964) pp. 553 and 560.

*Primary Examiner*—Edward J. Smith
*Attorney, Agent, or Firm*—Curtis, Morris & Safford

[57] ABSTRACT

Copolymers of ethylene and higher 1-olefins which are suitable for the manufacture of thin films, are preferably prepared in a two-step process, the first step yielding a polymer having a high molecular weight, the second step giving a polymer having a low molecular weight. The films obtained from these copolymers have improved mechanical properties as compared to films manufactured from known corresponding raw materials. The mechanical properties are furthermore uniform in longitudinal and in transverse direction.

3 Claims, No Drawings

ETHYLENE COPOLYMERS AND THEIR USE FOR THE MANUFACTURE OF FILMS

This is a continuation, of application Ser. No. 2,867 filed Jan. 11, 1979, now abandoned.

This invention provides ethylene copolymers which can be processed according to known methods to give tough films having substantially uniform mechanical values in longitudinal and transverse direction.

Films can be manufactured according to known processes from low density, medium density or high density polyethylene (LDPE, MDPE and HDPE, respectively). Such products are available on the market. It is furthermore known that films having uniform mechanical values in longitudinal and transverse direction can be manufactured from LDPE, while starting from HDPE, especially at low blow-up ratio and a thickness of above 0.025 mm, films are obtained the mechanical values of which in longitudinal and transverse direction differ considerably.

There is known a copolymer of ethylene and a comonomer which latter one consists of at least one mono-alpha-olefin with the proviso that at least 50% of this mono-alpha-olefin contain 5 or more carbon atoms. The copolymer has a density of 0.918 to 0.940 g/cm$^3$, an effective viscosity, measured at 200° C. and a shear rate of 100 s$^{-1}$, of from 0.5 . 10$^3$ to 3.0 . 10$^3$Nsm$^{-2}$, and a viscosity measured at a shear stress of 10$^3$ N/m$^2$, which is at least 2 A . e$^{(1.6\,A.10^{-3})}$ and not less than 1000 A (A being the effective viscosity at 200° C. and a shear rate of 100 s$^{-1}$). The films manufactured from this copolymer have a high impact strength, tear strength and stiffness; however, this requires a relatively high comonomer content of from 6.5 to 30 weight % (see German Offenlegungsschrift (DE-OS) No. 2,609,527).

It has now been found that polyethylenes of high density (HDPE) can be prepared which, at low blow-up ratio, can be processed to films having a thickness of more than 0.025 mm and substantially uniform mechanical values in longitudinal and transverse direction.

Subject of this invention is therefore the use of these polyethylenes as indicated in the claims, and a process for their manufacture.

These ethylene copolymers can be processed on widely known film manufacturing equipment to give tough films the surface of which is neither rough nor structured. The polymers display this good processing behavior without requiring amounts of additives exceeding the normal quantities. Furthermore, in the manufacture of blown films, the blow-up ratio may be varied, thus allowing to produce films having mechanical properties in longitudinal and transverse direction which are considerably more uniform than those of the commercial HDPE materials. Moreover, the films manufactured from the copolymers in accordance with this invention are distinguished by being less permeable to gas.

The copolymers of the invention are those of ethylene with 1-olefins of the formula R—CH=CH$_2$, in which R is an alkyl radical having from 1 to 6 carbon atoms, preferably with butene-1, which are prepared according to the low pressure process (Ziegler process).

The copolymers contain from 0.5 to 5.5, preferably 2 to 5, weight % of the comonomer, which content is calculated on the consumption of comonomer during the polymerization, relative to the total amount of polymer formed.

The copolymers have a density according to German Industrial Standard DIN 53 479 in the range of from 0.935 to 0.945 g/cm$^3$, that is, extending from the lower limit of the HDPE range into the MDPE range. They have a melt flow index 190/5 according to German Industrial Standard DIN No. 53 735 in the range of from 0.2 g/10 min to 0.05 g/10 min. The quotient of the melt flow indices MFI 190/15 /MFI 190/5 is greater than 8. This value indicates that the copolymers have a broad molecular weight distribution. This distribution can be determined according to diverse methods; in this case, it is measured by gel permeation chromatography. On the data obtained, the quotient M$_w$/M$_n$ (M$_w$=mean molecular weight; M$_n$=mean molecular weight number) can be calculated as a measure for the range of molecular weight distribution. In the case of the polymers according to the invention, the M$_w$/M$_n$ value is in the range of from 10 to 20, that is, these polymers belong to those which have a very broad molecular weight distribution. The shear viscosity of these polymers, at 200° C. and a shear stress of 10$^5$ N/m$^2$, is from 6 . 10$^3$ to 1 . 10$^5$ Pa . s, while at a shear stress of 10$^2$ N/m$^2$, it is in a range of from 4 . 10$^5$ to 4 . 10$^6$ Pa . s, which values were determined according to known methods (J. R. van Wazer, J. W. Lyons, K. Y. Kim, R. E. Colwell, Viscosity and Flow Measurements, Interscience Publisher, New York, 1963).

The copolymers in accordance with this invention are manufactured according to the low pressure (Ziegler) process; operations being carried out in suspension in an inert dispersion medium, or in gaseous phase.

As inert dispersion medium, an aliphatic or cycloaliphatic hydrocarbon may be used, for example pentane, hexane, heptane, cyclohexane, methylcyclohexane, gasoline or Diesel oil fractions carefully freed from oxygen, sulfur compounds and moisture. Aromatic hydrocarbons such as benzene, toluene, xylene are less useful. Preferred are saturated hydrocarbons.

Operations are carried out continuously or batchwise, in a single-step or multi-step mode, preferably batchwise in two steps. In the case of suspension polymerization, the reaction temperature is in a range of from 20° to 100° C., preferably 70° to 90° C. At this temperature, the polymer is obtained in the form of a partially crystallized phase, except a small amount (about 1 to 2 weight %) of very low molecular weight copolymers dissolved in the dispersion medium. The polymerization pressure is from 0.5 to 50, preferably 1 to 40, bars.

The mixed catalyst used for the manufacture of the copolymers of the invention consists of a titanium-containing compound (component A) and an organo-aluminum compound (component B).

A suitable titanium-containing compound is for example the product obtained according to the process described as follows:

In a 300-liter vessel provided with agitator, and under a nitrogen blanket, 5.5 liters, corresponding to 50 mols, of purest, distilled titanium tetrachloride are introduced together with 60 liters of degassed hydrocarbon freed from oxygen and sulfur compounds and from olefins (petroleum fraction b.p. 200° to 250° C.), and the batch is cooled to 0° to −10° C. Within 3 hours, 110 mols of ethylaluminum sesquichloride, dissolved in the above petroleum fraction (200 to 300 g/l), are added dropwise, while the temperature is maintained at −2° to +1° C. by means of cooler tubes. Subsequently, agitation is continued for a further 6 hours at −2° to 0° C., the precipitate formed is then separated from the reaction mother liquor via a candle filter device and washed thrice at room temperature with 50 liters each of the petroleum fraction. Thereafter, it is suspended in 150 liters of the petroleum fraction, and the candle filter is washed twice with 20 liters each of the petroleum fraction. Thus, 160 kg of an about 0.23 molar titanium(III) chloride suspension is obtained, which corresponds to a yield of about 93%, relative to the titanium tetrachloride used. All operations are carried out with careful exclusion of atmospheric oxygen.

The $TiCl_3$ dispersion obtained is subsequently stirred for 3 hours at 100° C. under an atmosphere of purest nitrogen, suction-filtered and washed twice at room temperature with the same volume of petroleum fraction, suspended in the same volume of dispersion medium, and used for polymerization.

Alternatively, the product prepared as follows is suitable as titanium-containing compound.

Under a $N_2$ blanket, 9 liters of hydrogenated Diesel oil (b.p. 130° to 170° C.) and 857 g of magnesium ethylate are introduced into a 20-liter stainless steel reactor provided with agitator. The batch is heated with agitation to 100° C. within ½ hour, and 2.84 kg ($=1.65$ liters) of titanium tetrachloride are added within 4 hours at this temperature. Subsequently, agitation is continued for 8 hours at 100° C., and the precipitate then is freed from the soluble reaction products by repeated washing with Diesel oil and decanting. It may then be used for polymerization in the form of a suspension.

There are suitable as component B chlorine-containing organo-aluminum compounds such as dialkyl-aluminum monochlorides of the formula $R^2_2AlCl$ or alkyl-aluminum sesquichlorides of the formula $R^2_3Al_2Cl_3$, in which formulae $R^2$ is a hydrocarbon radical having from 1 to 16 carbon atoms, preferably an alkyl radical having from 1 to 16, especially 2 to 4, carbon atoms, for example: $(C_2H_5)_2AlCl$, $(i-C_4H_9)_2AlCl$, $(C_2H_5)_3Al_2Cl_3$.

Suitable organo-aluminum compounds are furthermore the reaction products of aluminum trialkyls or aluminum dialkyl hydrides the alkyl radicals of which have from 1 to 16 carbon atoms with dienes having from 4 to 20 carbon atoms.

As component B, there are especially advantageously used aluminum-trialkyls of the formula $AlR^2_3$ or aluminumdialkyl hydrides of the formula $AlR^2_2H$, in which formulae $R^2$ is as defined above, for example $Al(C_2H_5)_3$, $Al(C_2H_5)_2H$, $Al(C_3H_7)_2H$, $Al(i-C_4H_9)_3$, $Al(i-C_4H_9)_2H$.

Preferred is a batchwise, two-step process, in the first polymerization step of which a high molecular weight copolymer ($RSV=5$ to 15, preferably 6 to 10 dl/g, measured at 135° C. in decahydronaphthalene at $c=0.1$ g/10 $cm^3$) is formed in gaseous phase in the presence of from 0 to 20% of hydrogen. The amount of this high molecular weight polymer is from 45 to 70, preferably 55 to 65, weight %, relative to the total amount of polymer. In this polymerization step, an ethylene/comonomer mixture is introduced into the reactor, so that a polymer having from 0.5 to 5.5, preferably 2 to 5, weight % of comonomer is obtained. The RSV value can be adjusted by means of hydrogen. When from 45 to 70 weight % of the polymer are obtained, the polymerization is switched over to the second polymerization step by adjusting a pressure of such an amount of hydrogen on the reaction vessel which ensures that in the gas zone a hydrogen content of from 45 to 80, preferably 55 to 65, % by volume is established. Also in the second polymerization step, an ethylene/comonomer mixture is introduced into the reactor, which mixture may be identical to that of the first step, or may contain more or less comonomer. In this step, from 30 to 55 weight % of a low molecular weight copolymer having a RSV value of 0.5 to 3, preferably 1.0 to 2.0, dl/g are obtained. Polymerization is carried out in both steps at a temperature of from 25° to 90° C., preferably 70° to 90° C. Polymerization is carried out under a pressure of from 0.5 to 50 bars, preferably 1 to 10 bars.

After a polymerization time of from 4 to 8 hours, preferably 5.5 to 6.5 hours, the copolymer is filtered off from the dispersion medium, and dried.

For the manufacture of films from the copolymers of the invention, usual film blowing equipment may be employed. Such an equipment consists of a screw extruder wherein the polymer powder or the polymer granules fed in are molten, vented and homogenized, and the polymer mass is then forced through a ring nozzle to form a tubular film which is squeezed off at a certain distance from the nozzle. Between the nozzle and the squeezing device, the tubular film is inflated by air or another gas, so that the intended film thickness is obtained. Behind the squeezing device, the tubular film is wound up, and optionally ripped up.

The mechanical values of the films manufactured from the copolymers of the invention are improved as compared to those of films obtained from corresponding commercial HDPE, MDPE and LDPE raw materials.

The corresponding comparable data are listed in Table 3. They demonstrate that the films in accordance with the invention are nearly isotropic, because the mechanical values in longitudinal and transverse direction are substantially uniform. Tear strength and elongation at break according to German Industrial Standard DIN 53 455 are above 25 $N/mm^2$ and 600%, respectively. Tear initiation resistance and tear propagation resistance according to German Industrial Standard DIN 53 515 are above 150 N/mm and 100 N/mm, respectively. Impact strength according to German Industrial Standard DIN 53 448 is above 2500 $mJ/mm^2$ in both directions. A further property by which the films manufactured from these ethylene copolymers are distinguished from those made from MDPE and LDPE is a lower degree of permeability to gas. The corresponding values are listed in Table 4, and they were measured according to German Industrial Standards DIN Nos. 53 122 and 53 380.

EXAMPLE 1

The catalyst is prepared in a 2-liter 4-necked flask provided with paddle agitator, dropping funnel, reflux condenser, thermometer and a device for establishing a blanket of dry nitrogen or argon. For this purpose, 1.2 liters of a hydrocarbon mixture (b.p. 130°–170° C.) are introduced, which mixture should not contain aromatics and unsaturated hydrocarbons. It should be anhydrous and flushed with nitrogen or argon. In the dispersion medium, 1 mol of $Mg(OC_2H_5)_2$ is suspended, and the whole is heated to 100° C. At this temperature, 225 $cm^3$ (2 mols) of $TiCl_4$ are continuously added within 4 hours. Agitation is then continued for another 178 hours at the same temperature.

Subsequently, the dispersion medium is decanted off at a temperature of 70° C., and the solids are washed several times with fresh dispersion medium at 70° C., until the titanium concentration in the dispersion medium is below 10 mmols/liter (this Ti content is determined calorimetrically by means of hydrogen peroxide; see G. O. Müller, Praktikum der quantitativen chemischen Analyse, 4th ed. (1957), p. 243).

100 liters of dispersion medium are introduced into a 170-liter reactor provided with agitator, heating jacket and different inlets for dispersion medium, catalyst, cocatalyst, ethylene, comonomers and hydrogen. The contents of the reactor are heated to 85° C. Under an atmosphere of protecting gas (nitrogen), 400 mmols of $Al(C_2H_5)_3$ are added, and subsequently the above catalyst. The catalyst amount used is calculated on the amount of titanium compound, and it is 30 mmols of the titanium compound.

6.7 kg of ethylene/h and 0.24 kg of butene-1/h are now introduced within 6 hours into the dispersion medium. During the reaction time of 3 hours 20 minutes, no hydrogen is present in the system as molecular weight regulator. Subsequently, a pressure is established and maintained using an amount of hydrogen which ensures that during the remaining reaction time of 2 hours 40 minutes there is a hydrogen concentration of from 60 to 65% by volume in the gas zone. The pressure in the reactor rises to 7–8 bars until the end of the polymerization.

After 6 hours, the polymer is filtered off in hot state, and dried. The polymer data are indicated in Table 1 sub product 1.

EXAMPLE 2

This test is carried out according to Example 1, with the exception that 0.18 kg of butene-1/h are introduced. The characteristic polymer data are indicated in Table 1 sub product 2.

EXAMPLE 3

The polymerization vessel is readied as indicated in Example 1. 6.7 kg of ethylene/h and 0.36 kg of hexene-1/h are introduced within 6 hours into the dispersion medium. During 3 hours 50 minutes of reaction time, no hydrogen is present in the system. Thereafter, a pressure is established and maintained using such an amount of hydrogen which ensures that during the remaining 2 hours 10 minutes of reaction time there is a hydrogen concentration of 65% by volume in the gas zone. After 6 hours, the polymer is filtered off in hot state, and dried. The characteristic polymer data are indicated in Table 1 sub product 3.

EXAMPLE 4

The polymers prepared according to Examples 1 to 3 and 3 commercial polymers A (HDPE), B (MDPE) and C (LDPE) are processed on a film blowing equipment to give films.

This equipment consists of an extruder the screw of which has a length of 20×D and a diameter D of 30 mm. The ring nozzle has a diameter of 51 mm and a gap width of 0.8 mm. The extruded tubular film is inflated by air and cooled. The blown film is drawn off from the extruder in downward direction. During the film manufacture, the blow-up ratio (diameter of nozzle/diameter of tubular film) and the draw-off rate of the tubular film is varied (see Table 2), thus allowing alteration of the thickness of the films. The extruder output at 80 rpm is 6 kg/h. The temperature in the extruder and in the nozzle is in each case 175°–240° C. and 240° C., respectively.

The films obtained from the copolymers of the invention and those manufactured from the comparative products A to C are examined with respect to their properties. The corresponding data are indicated in Table 3.

The gas permeability of a film obtained from the copolymer according to Example 2 and that of the film of Comparative Sample B are indicated in Table 4.

Remarks to Table 2

1 The product A is generally processed to thin films (thickness 0.01 to 0.025 mm) and at a higher blow-up ratio. In this case, also this raw material yields more uniform films the impact strength values of which longitudinally and transversely to the extrusion direction is in a range of from 2000 to 400 mJ/mm².

TABLE 1

| Product Comparative product | Comonomer | Comonomer content wt.-% | Density g/cm³ | MFI 190/5 g/10 min | MFI 190/15 / MFI 190/5 |
|---|---|---|---|---|---|
| 1 | butene-1 | 2.5–3.0 | 0.940 | 0.16 | 8.8 |
| 2 | butene-1 | 2.0–2.5 | 0.942 | 0.16 | 8.5 |
| 3 | hexene-1 | 4–5 | 0.941 | 0.08 | 9 |
| A (HDPE) | — | — | 0.953 | 0.3 | 11 |
| B (LDPE) | — | — | 0.916 | 1.1 | 8.5 |
| C (MDPE) | — | — | 0.918 | 2.9 | 8 |

A, B and C commercial products without filler

TABLE 2

Processing according to the blow molding processes

| Product | | inflation ratio* | 1:2 a | 1:2 b | 1:3.5 c | 1:3.5 d |
|---|---|---|---|---|---|---|
| A | film thickness mm | | 0.170 | 0.110 | 0.095 | 0.060 |
| | impact strength long. / mJ / mm² | | 1300 | 1950 | 1350 | 3000 (1) |
| | impact strength transv. / mJ / mm² | | 100 | 90 | 140 | 130 (1) |
| Example 2 | film thickness mm | | 0.190 | 0.105 | 0.090 | 0.060 |
| | impact strength long. / mJ / mm² | | 3750 | 3850 | 3600 | 4600 |
| | impact strength transv. / mJ / mm² | | 3200 | 3300 | 3100 | 3800 |
| C | film thickness mm | | 0.180 | 0.110 | 0.100 | 0.060 |
| | impact strength long. / mJ / mm² | | 2250 | 2650 | 2200 | 2820 |
| | impact strength transv. / mJ / mm² | | 1900 | 1900 | 2200 | 2760 | a: Length of throat section 3.8 × nozzle diameter, draw-off rate 2 m/min.
b: Length of throat section 3.8 × nozzle diameter, draw-off rate 4 m/min.
c: Length of throat section 3.8 × nozzle diameter, draw-off rate 2 m/min.
d: Length of throat section 3.8 × nozzle diameter, draw-off rate 4 m/min.
*: nozzle diameter / diameter of tubular film

TABLE 3

| Sample* Comparative sample | DIN 53 455 tear strength N/mm² | | DIN 53 455 elongation at break % | | DIN 53 515 tear initiation resistance N/mm | | DIN 53 515 tear propagation resistance N/mm | | DIN 53 448 impact strength mJ/mm² | |
|---|---|---|---|---|---|---|---|---|---|---|
| | l | q | l | q | l | q | l | q | l | q |
| 1 | 40 | 44 | 850 | 940 | 173 | 174 | 123 | 103 | 4000 | 3000 |
| 2 | 34 | 26 | 720 | 680 | 163 | 160 | 131 | 102 | 3750 | 3200 |
| 3 | 41 | 44 | 770 | 750 | 196 | 204 | 132 | 100 | 3400 | 2900 |
| A | 39 | 45 | 900 | 920 | 195 | 208 | 138 | 125 | 1300 | 100 |
| B | 21 | 18 | 500 | 720 | 105 | 123 | 83 | 63 | 2000 | 2000 |
| C | 26 | — | 960 | — | — | — | 273 | — | 2250 | 1900 |

*the thickness of the films is from 0.170 to 0.180 mm
l: longitudinally to extrusion direction
q: transversally to extrusion direction

TABLE 4

Gas permeability of
0.100 mm films in cm³ gas/m² · 24 h at 20° C.

| | LDPE film from B | film from copolymer according to Example 2 |
|---|---|---|
| $CO_2$ | 6800 | 3300 |
| $N_2$ | 530 | 240 |
| $O_2$ | 1700 | 870 |
| $H_2O$* | 0.8–2.5 | 0.41 |

*in g $H_2O/m^2$ 24 h

What is claimed is:

1. A copolymer of ethylene containing from 94.5 to 99.5 weight % of ethylene units and from 0.5 to 5.5 weight % of 1-olefin units of the formula R—CH=CH₂, in which R is an alkyl radical having from 1 to 6 carbon atoms, said copolymer having a density of from 0.935 to 0.945 g/cm³, a melt index MFI 190/5 of from 0.05 to 0.2 g/10 min., a melt index ratio $$\frac{MFI\ 190/15}{MFI\ 190/5}\ \text{greater than 8,}$$

a shear viscosity of from $4 \cdot 10^5$ to $4 \cdot 10^6$ Pa . s, at 200° C. and at a shear stress of $10^2$ N/m², a shear viscosity of from $6 \cdot 10^3$ to $1 \cdot 10^5$ Pa . s at 200° C. and at a shear stress of $10^5$ N/m², a tear strength above 25 N/mm², an elongation at break above 600%, a tear initiation resistance above 150 N/mm, a tear propagation resistance above 100 N/mm, and an impact strength above 2500 mJ/mm².

2. An ethylene copolymer film consisting essentially of an ethylene copolymer containing from 94.5 to 99.5 weight % of ethylene units and from 0.5 to 5.5 weight % of 1-olein units of the formula R—CH=CH₂, in which R is an alkyl radical having from 1 to 6 carbon atoms, said copolymer having a density of from 0.935 to 0.945 g/cm³, a melt index MFI 190/5 of from 0.05 to 0.2 g/10 min, a melt index ratio $$\frac{MFI\ 190/15}{MFI\ 190/5}\ \text{greater than 8,}$$

a shear viscosity of from $4 \cdot 10^5$ to $4 \cdot 10^6$ Pa . s, at 200° C. and at a shear stress of $10^2$ N/m², a shear viscosity of from $6 \cdot 10^3$ to $1 \cdot 10^5$ Pa . s at 200° C. and at a shear stress of $10^5$ N/m², a thickness of from 0.05 to 0.25 mm, a tear strength in longitudinal and transverse direction above 25 N/mm², an elongation at break above 600%, a tear initiation resistance above 150 N/mm, a tear propagation resistance above 100 N/mm, and an impact strength above 2500 mJ/mm².

3. A process for the preparation of an ethylene copolymer containing from 94.5 to 99.5 weight % of ethylene units and from 0.5 to 5.5 weight % of 1-olefin units of the formula R—CH=CH₂, in which R is an alkyl radical having from 1 to 6 carbon atoms, said copolymer having a density of from 0.935 to 0.945 g/cm³, a melt index MFI 190/5 of from 0.05 to 0.2 g/10 min, a melt index ratio $$\frac{MFI\ 190/15}{MFI\ 190/5}\ \text{greater than 8,}$$

and a shear viscosity of from $6 \cdot 10^3$ to $1 \cdot 10^5$ Pa . s at 200° C. and at a shear stress of $10^5$ N/m², and a shear viscosity of from $4 \cdot 10^5$ to $4 \cdot 10^6$ Pa . s at 200° C. and at a shear stress of $10^2$ N/m² said process comprising copolymerizing in two steps ethylene and a 1-olefin of the formula R—CH=CH₂, in which R is an alkyl radical having from 1 to 6 carbon atoms, in suspension or in gaseous phase, at a temperature of from 20° to 150° C., under a pressure of from 0.5 to 50 bars, in the presence of a mixed catalyst consisting of a titanium-containing compound and an organo-aluminum compound, adjusting the molecular weight of the copolymer by means of hydrogen, maintaining the hydrogen concentration in the first step at a value to produce from 45 to 70 weight % of a high molecular weight copolymer having a RSV of from 5 to 15 dl/g and maintaining the hydrogen concentration in the second step at a value to produce from 30 to 55 weight % of a low molecular weight copolymer having a RSV of from 0.5 to 3 dl/g.

* * * * *